(12) United States Patent
Perevozchikov et al.

(10) Patent No.: US 12,247,773 B2
(45) Date of Patent: *Mar. 11, 2025

(54) SYSTEM AND METHOD FOR EXTENDING THE OPERATING RANGE OF A DYNAMIC COMPRESSOR

(71) Applicant: Copeland LP, Sidney, OH (US)

(72) Inventors: Michael M. Perevozchikov, Tipp City, OH (US); Matthew J. Swallow, Versailles, OH (US); Zheji Liu, Tipp City, OH (US)

(73) Assignee: Copeland LP, Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,762

(22) Filed: Mar. 22, 2024

(65) Prior Publication Data
US 2024/0230197 A1    Jul. 11, 2024

Related U.S. Application Data

(62) Division of application No. 17/585,736, filed on Jan. 27, 2022, now Pat. No. 11,946,678.

(51) Int. Cl.
*F25B 49/02* (2006.01)
*F04D 27/02* (2006.01)
*F25B 31/02* (2006.01)

(52) U.S. Cl.
CPC ........ *F25B 49/022* (2013.01); *F04D 27/0246* (2013.01); *F25B 31/026* (2013.01);
(Continued)

(58) Field of Classification Search
CPC .. F04D 27/0246; F25B 31/026; F25B 49/022; F25B 2600/022; F25B 2600/0253; F25B 2700/193
See application file for complete search history.

(56) References Cited

U.S. PATENT DOCUMENTS 3,011,322 A    12/1961   Tanzberger et al.
5,857,348 A     1/1999   Conry
(Continued)

FOREIGN PATENT DOCUMENTS

AU        686174 B2      2/1998
JP     2009264305 A     11/2009
WO    2009058975 A1      5/2009

OTHER PUBLICATIONS

International Search Report and Written Opinion for International Application No. PCT/US2022/082320, dated Apr. 25, 2023; 12 pages.

*Primary Examiner* — Jonathan Bradford
(74) *Attorney, Agent, or Firm* — Armstrong Teasdale LLP

(57) ABSTRACT

A system includes a dynamic compressor and a controller having a processor and a memory. The compressor includes a first compressor stage having a first variable inlet guide vane (VIGV) and a second compressor stage having a second VIGV. The memory stores instructions that program the processor to operate the compressor at a current speed, a first position of the first VIGV, and a second position of the second VIGV to compress the working fluid, and to determine if a condition is satisfied. If the condition is not satisfied, the processor is programmed to continue to operate the compressor at the current speed, the first position of the first VIGV, and the second position of the second VIGV. If the condition is satisfied, the processor is programmed to change the second position of the second VIGV to a third position and maintain the first position of the first VIGV.

20 Claims, 15 Drawing Sheets

(52) U.S. Cl.
CPC . *F25B 2600/022* (2013.01); *F25B 2600/0253* (2013.01); *F25B 2700/193* (2013.01)

(56) References Cited

U.S. PATENT DOCUMENTS

| | | |
|---|---|---|
| 8,156,757 B2 | 4/2012 | Doty et al. |
| 9,382,911 B2 | 7/2016 | Sun et al. |
| 10,267,539 B2 | 4/2019 | Sishtla |
| 10,544,791 B2 | 1/2020 | De |
| 10,634,154 B2 | 4/2020 | Morgan et al. |
| 10,724,546 B2 | 7/2020 | Morgan et al. |
| 2005/0132705 A1 | 6/2005 | Boley et al. |
| 2015/0107289 A1 | 4/2015 | Sun et al. |
| 2017/0174049 A1 | 6/2017 | He et al. |
| 2018/0073779 A1 | 3/2018 | Johnson et al. |
| 2018/0073785 A1 | 3/2018 | Jonsson et al. |
| 2019/0285317 A1 | 9/2019 | Shi |
| 2021/0010478 A1 | 1/2021 | Masaki et al. |

SYSTEM AND METHOD FOR EXTENDING THE OPERATING RANGE OF A DYNAMIC COMPRESSOR

CROSS REFERENCE TO RELATED APPLICATIONS

This application is a divisional application of and claims priority to U.S. patent application Ser. No. 17/585,736 filed on Jan. 27, 2022, the entire disclosure of which is hereby incorporated by reference in its entirety.

FIELD OF THE DISCLOSURE

The field of the disclosure relates to control systems, and more particularly, to control systems for dynamic compressors.

BACKGROUND

Dynamic compressors, including centrifugal compressors, are commonly used in process industries and in heating, ventilation, and air conditioning (HVAC) systems. The compressor is operatively connected to a motor via a shaft that supports multiple compression stages. The motor rotates the compression stages via the shaft at a rotational speed and loading condition selected to compress a refrigerant to a specified demand. The motor speed and load can be controlled to operate the compressor under a wide range of operating conditions. The operating range of the compressor is limited by regions of surge at low flow rates, and by regions of choke at high flow rates. Knowledge of the precise operating point of the compressor can help avoid operating in surge or choke.

In a multi-stage compressor, the refrigerant enters each compressor stage at a different pressure and volumetric flow rate. Each stage must therefore be designed to "match" the others so each stage can effectively handle the fluid it receives from the prior stage, and the compressor can operate safely and efficiently under a wide range of operating conditions.

In addition to the dynamic compressor, most HVAC systems include a condenser, an expansion device, and an evaporator fluidly coupled to the dynamic compressor in a closed loop. In some applications, the basic cycle is modified with additional components or alternate configurations to improve the system's performance and efficiency. For example, some HVAC systems use an economization loop that diverts a portion of low-temperature liquid refrigerant from downstream of the condenser through a heat exchanger or flash tank to cool the main flow. Downstream of the heat exchanger or flash tank, an additional portion of flow may be diverted through a medium-temperature evaporator. The diverted portion, or the economization flow, is then injected between compressor stages as a low temperature, intermediate-pressure gas, improving the efficiency of the system as a whole. Other systems may remove flow from between compressor stages and divert it through an additional condenser, allowing for additional applications.

In such systems, adding or removing flow between compressor stages will cause the stages to no longer be aerodynamically matched. Without proper stage matching, the stages downstream of the injection may enter an undesirable flow regime at a different condition than the rest of the compressor, compromising the performance, efficiency, and safety of the machine as a whole. Thus, it is desirable to maintain the aerodynamic match across stages both with and without changes in mass flow between stages.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a system having a dynamic compressor operable to compress a working fluid, a valve in fluid communication with the dynamic compressor, and a controller connected to the dynamic compressor. The dynamic compressor includes a first compressor stage having a first variable inlet guide vane (VIGV) controllable to selectively introduce pre-whirl into working fluid entering the first compressor stage, a second compressor stage having a second VIGV controllable to selectively introduce pre-whirl into working fluid entering the second compressor stage, and a motor configured to drive the first compressor stage and the second compressor stage at a same speed. The valve is in fluid communication with the dynamic compressor between the first compressor stage and the second compressor stage. The controller includes a processor and a memory. The memory stores instructions that program the processor to operate the dynamic compressor at a current speed, a first position of the first VIGV, and a second position of the second VIGV to compress the working fluid, and to determine if a condition is satisfied. If the condition is not satisfied, the instructions stored in the memory program the processor to continue to operate the compressor at the current speed, the first position of the first VIGV, and the second position of the second VIGV. If the condition is satisfied, the instructions stored in the memory program the processor to change the second position of the second VIGV to a third position different than the second position and maintain the first position of the first VIGV.

Another aspect of the present disclosure is directed to a controller for a dynamic compressor having a motor, a first compressor stage driven by the motor, and a second compressor stage driven by the motor. The controller includes a processor and a memory. The memory stores instructions that program the processor to operate the dynamic compressor at a current speed, a first position of a first VIGV of the first compressor stage, and a second position of a second VIGV of the second compressor stage to compress a working fluid. The first VIGV is controllable to selectively introduce pre-whirl into working fluid entering the first compressor stage and the second VIGV is controllable to selectively introduce pre-whirl into working fluid entering the second compressor stage. The processor determines if a condition is satisfied. If the condition is not satisfied, the instructions stored in the memory program the processor to continue to operate the compressor at the current speed, the first position of the first VIGV, and the second position of the second VIGV. If the condition is satisfied, the instructions stored in the memory program the processor to change the second position of the second VIGV to a third position different than the second position and maintain the first position of the first VIGV.

Another aspect of the present disclosure is directed to a method of extending an operating range of a dynamic compressor that is compressing a working fluid. The dynamic compressor has a motor, a first compressor stage driven by the motor, and a second compressor stage driven by the motor. A valve is in fluid communication with the dynamic compressor between the first compressor stage and the second compressor stage. The method includes operating the dynamic compressor at a current speed, a first position of a first VIGV of the first compressor stage, and a second position of a second VIGV of the second compressor stage to compress the working fluid. The first VIGV is controllable to selectively introduce pre-whirl into working fluid entering the first compressor stage and the second VIGV is controllable to selectively introduce pre-whirl into working fluid entering the second compressor stage. The method includes determining if a condition is satisfied. The method further includes continuing to operate the compressor at the current speed, the first position of the first VIGV, and the second position of the second VIGV when the condition is not satisfied, and changing the second position of the second VIGV to a third position different than the second position and maintaining the first position of the first VIGV when the condition is satisfied.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

For conciseness, examples will be described with respect to a centrifugal compressor. However, the methods and systems described herein may be applied to any suitable dynamic compressor. The performance and efficiency of an HVAC system can be improved by diverting portions of the main flow through supplemental loops and cycle components. In such systems, flow can be injected or removed between compressor stages such that each stage has a different mass flow rate. However, aerodynamic matching between stages should be maintained both with and without such flow modifications in order to avoid operation in undesirable conditions. A controls strategy can be used to determine when stages are no longer flow-matched and adjust a variable inlet guide vane (VIGV) at each stage's inlet to restore proper stage matching.

Figure 1:
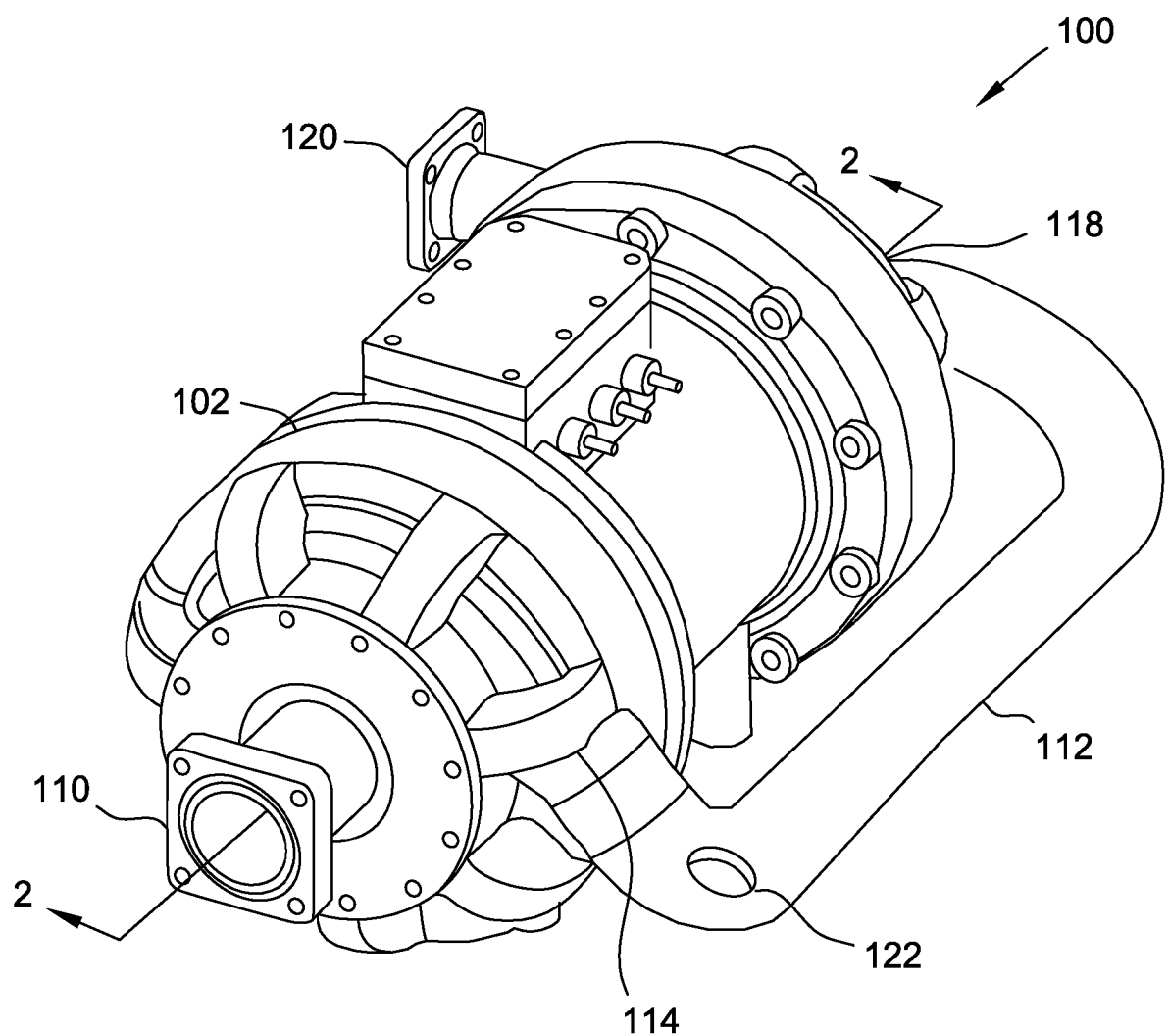
FIG. 1 is a perspective view of an assembled dynamic compressor.

Referring to FIG. 1, a two-stage refrigerant compressor is indicated generally at 100. The compressor 100 is operable to compress a working fluid (e.g., refrigerant), and includes a compressor housing 102 that forms at least one sealed cavity within which each stage of refrigerant compression is accomplished. The compressor 100 includes a first refrigerant inlet 110 to introduce refrigerant vapor into the first compressor stage (not labeled in FIG. 1), a first refrigerant exit 114, a refrigerant transfer conduit 112 to transfer compressed refrigerant from the first compressor stage to the second compressor stage, a second refrigerant inlet 118 to introduce refrigerant vapor into the second compressor stage (not labeled in FIG. 1), and a second refrigerant exit 120. The refrigerant transfer conduit 112 is operatively connected at opposite ends to the first refrigerant exit 114 and the second refrigerant inlet 118, respectively. The refrigerant transfer conduit 112 further includes a port 122 for adding or removing flow between the first and second compressor stages. The second refrigerant exit 120 delivers compressed refrigerant from the second compressor stage to a cooling system in which compressor 100 is incorporated (FIGS. 3-6).

Figure 2:
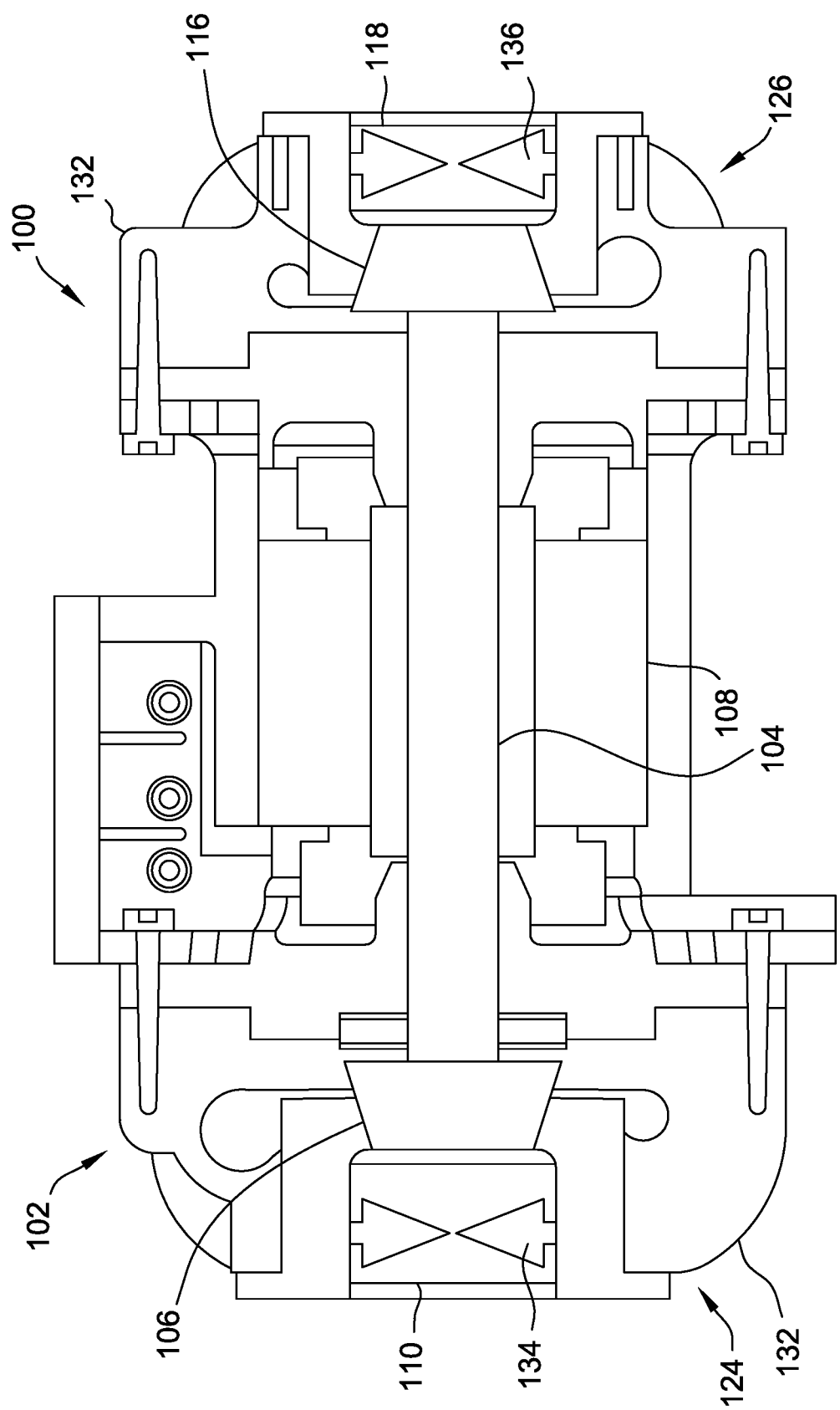
FIG. 2 is a cross-sectional view of the dynamic compressor of FIG. 1 taken along line 2-2 with the external conduit removed.

Referring to FIG. 2, the compressor housing 102 encloses a first compressor stage 124 and a second compressor stage 126 at opposite ends of the compressor 100. The first compressor stage 124 includes a first compression mechanism 106 configured to add kinetic energy to refrigerant entering via the first refrigerant inlet 110. In some embodiments, the first compression mechanism 106 is an impeller. The kinetic energy imparted to the refrigerant by the first compression mechanism 106 is converted to increased refrigerant pressure as the refrigerant velocity is slowed upon transfer to a sealed cavity (e.g., a diffuser) formed within the volute 132. The first compressor stage 124 additionally includes a first variable inlet guide vane (VIGV) 134 disposed upstream of the first compression mechanism 106 in the first refrigerant inlet 110. The first VIGV 134 includes a plurality of vanes whose position can be controlled to introduce pre-whirl into the gaseous refrigerant entering the first refrigerant inlet 110.

Similarly, the second compressor stage 126 includes a second compression mechanism 116 configured to add kinetic energy to refrigerant transferred from the first compressor stage 124 entering via the second refrigerant inlet 118. In some embodiments, the second compression mechanism 116 is an impeller. The kinetic energy imparted to the refrigerant by the second compression mechanism 116 is converted to increased refrigerant pressure as the refrigerant velocity is slowed upon transfer to a sealed cavity (e.g., a diffuser) formed within the volute 132. Compressed refrigerant exits the second compressor stage 126 via the second refrigerant exit 120 (not shown in FIG. 2). The second compressor stage 126 additionally includes a second variable inlet guide vane (VIGV) 136 disposed upstream of the second compression mechanism 116 in the second refrigerant inlet 118. The second VIGV 136 includes a plurality of vanes whose position can be controlled to introduce pre-whirl into the gaseous refrigerant entering the second refrigerant inlet 118.

The first compression mechanism 106 and second compression mechanism 116 are connected at opposite ends of a shaft 104. The shaft 104 is operatively connected to a motor 108 positioned between the first compression mechanism 106 and second compression mechanism 116 such that the first compression mechanism 106 and second compression mechanism 116 are rotated at a rotation speed selected to compress the refrigerant to a pre-selected pressure exiting the second refrigerant exit 120 (not shown in FIG. 2). Any suitable motor may be incorporated into the compressor 100 including, but not limited to, an electrical motor.

Figure 3:
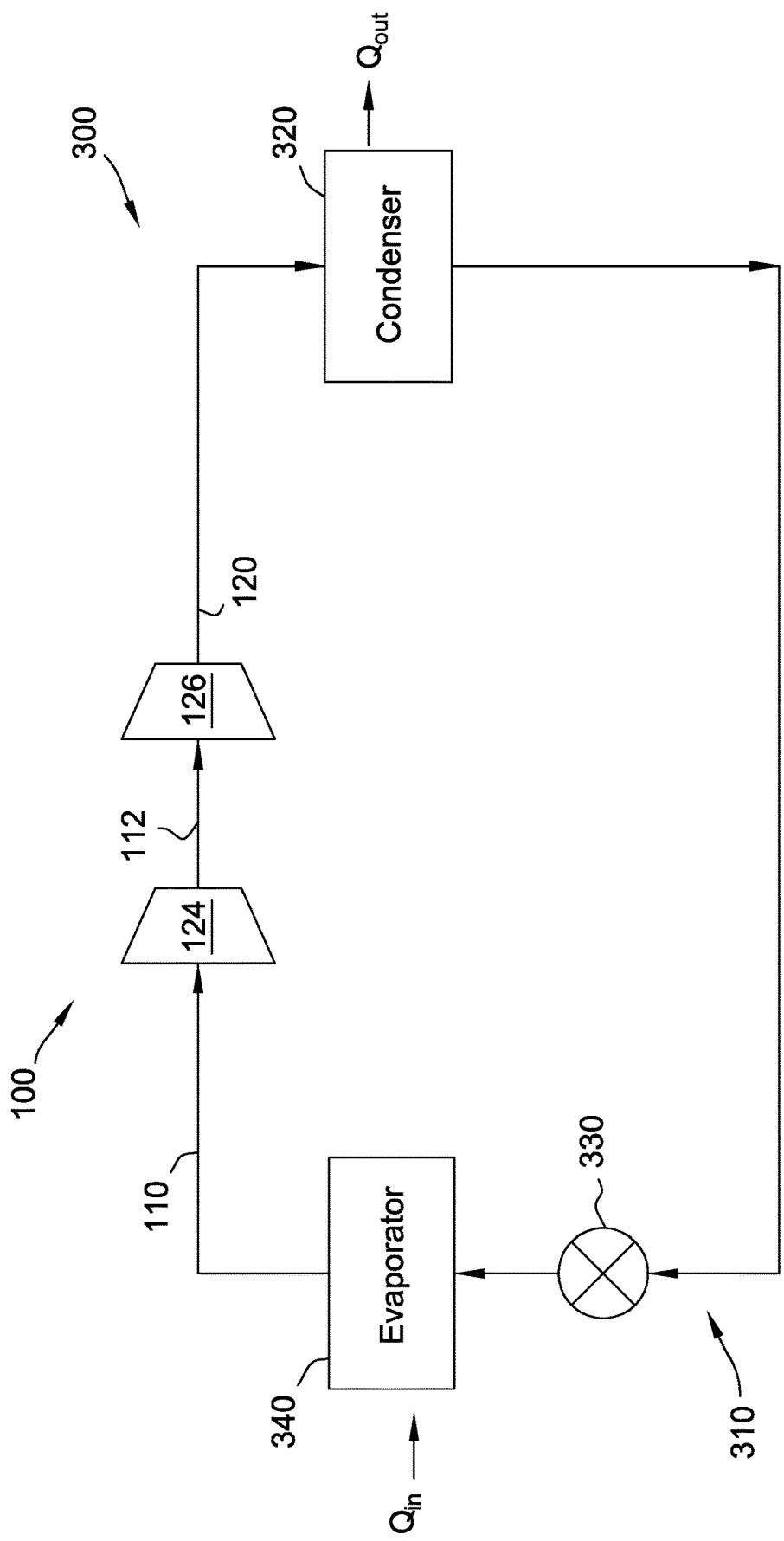
FIG. 3 is a schematic view of a first example HVAC system in which the dynamic compressor shown in FIGS. 1 and 2 can be installed.

FIG. 3 is a schematic diagram of a first example HVAC system 300 in which the compressor 100 of FIGS. 1 and 2 may be installed. The system 300 has a single, closed refrigerant loop 310 that includes the compressor 100, a condenser 320, a first expansion device 330, and an evaporator 340. Refrigerant enters the compressor 100 at the first refrigerant inlet 110 as a low-pressure, low-temperature gas. The first and second compressor stages 124, 126 add kinetic energy to the refrigerant and convert it to pressure rise, and the refrigerant exits the compressor 100 at the second refrigerant exit 120 as a high-pressure, high-temperature gas. The refrigerant enters the condenser 320, which is fluidly coupled to the second compressor stage 126, and heat $Q_{out}$ is removed to convert the refrigerant gas into a high-pressure, high-temperature liquid.

The condenser 320 is fluidly coupled to the first expansion device 330, which reduces the pressure of the refrigerant. In some embodiments, the pressure may be reduced until the liquid refrigerant's current temperature becomes the boiling point temperature at that pressure, and the refrigerant becomes a two-phase mixture as some of the liquid refrigerant boils and turns into a gas. The first expansion device 330 may be a fixed orifice, a thermal expansion valve, an electronic expansion valve, or any type of expansion device that allows the HVAC system 300 to function as described herein. The first expansion device 330 is fluidly coupled to the evaporator 340, which receives low-pressure, low-temperature liquid refrigerant or a two-phase mixture of liquid and gaseous refrigerant at its inlet. In the evaporator 340, the refrigerant absorbs heat $Q_{in}$ to change phase from a liquid to a gas. The evaporator 340 is fluidly coupled to the first compressor stage 124, and the cycle begins again.

Figure 4:
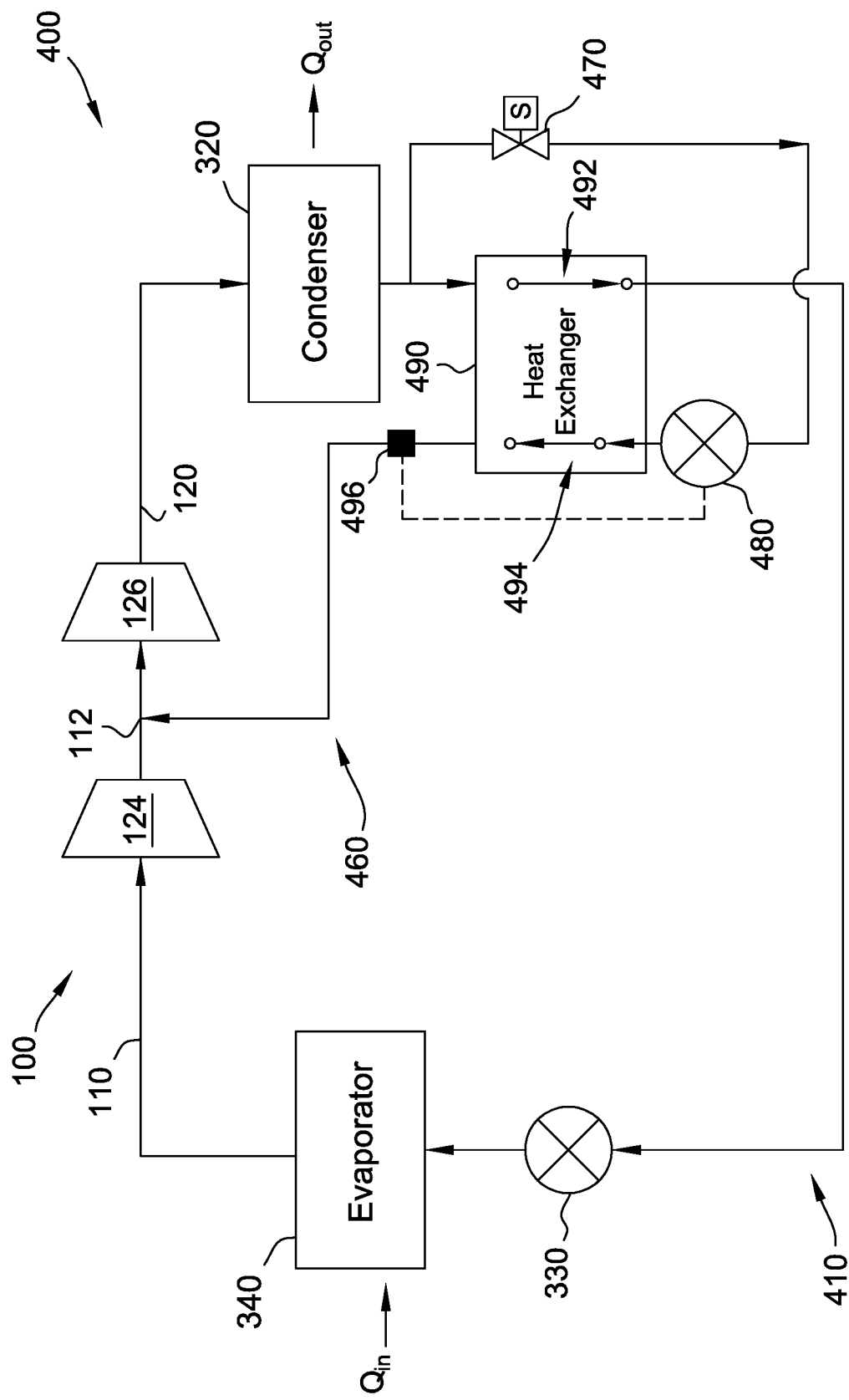
FIG. 4 is a schematic view of a second example HVAC system in which the dynamic compressor shown in FIGS. 1 and 2 can be installed.

FIG. 4 is a schematic diagram of a second example HVAC system 400 in which the compressor 100 of FIGS. 1 and 2 may be installed. The system 400 has a primary refrigerant loop 410 that includes the compressor 100, the condenser 320, a first stream 492 of a heat exchanger 490, the first expansion device 330, and the evaporator 340. The system 400 also has a secondary refrigerant loop 460 that is fluidly connected to a portion of the primary refrigerant loop 410 and controlled by an economization valve 470, which will be described in further detail herein.

The secondary refrigerant loop 460 includes the economization valve 470, a second expansion device 480, a second stream 494 of the heat exchanger 490, the second compressor stage 126, and the condenser 320. In the embodiment illustrated in FIG. 4, the components of the secondary refrigerant loop 460 are fluidly coupled in the order in which they are listed, with the condenser 320 being additionally coupled to the second expansion device 480 to close the secondary refrigerant loop 460.

The economization valve 470 can be fully open, partially open, or fully closed, and its status determines whether refrigerant will flow through the secondary refrigerant loop 460. That is, when the economization valve 470 is fully closed, all of the refrigerant will flow through the primary refrigerant loop 410, and the system 400 will operate in substantially the same way as the system 300 illustrated in FIG. 3. When the economization valve 470 is open, the liquid refrigerant exiting the condenser 320 separates into two streams, with the majority of refrigerant flowing through the primary refrigerant loop 410, and the remainder being diverted through the secondary refrigerant loop 460. The economization valve 470 can be a solenoid valve, electronic expansion valve, or any type of valve that allows the system 400 to function as described herein.

When open, the economization valve 470 is fluidly coupled to the second expansion device 480, which reduces the pressure of the liquid economizer flow until the liquid refrigerant's current temperature becomes the boiling point temperature at that pressure. The refrigerant in the secondary refrigerant loop becomes a two-phase mixture as some of the liquid refrigerant boils and turns into a gas as it enters the heat exchanger 490. The second expansion device can be sized and selected to divert a particular amount of refrigerant through the secondary refrigerant loop 460 when the economization valve 470 is open, for example, 0 to 20 percent of the total mass flow, or any amount of refrigerant flow that allows the system 400 to function as described herein.

In some embodiments, the second expansion device 480 is a thermal expansion valve (TXV) that adjusts the amount of refrigerant flow through the secondary refrigerant loop 460 based on the thermal load of the heat exchanger 490. The TXV works in combination with a bulb 496 located downstream of the second stream 494 of the heat exchanger 490. A membrane inside the TXV is movable to balance the refrigerant pressure inside the bulb with the refrigerant pressure upstream of the heat exchanger 490. The movement of the membrane is coupled to a needle that sets the position of the valve, thereby controlling the amount of refrigerant that flows through the secondary refrigerant loop 460. In further embodiments, the second expansion device 480 can also be a fixed orifice, an electronic expansion valve, or any type of expansion device that allows the system 400 to function as described herein.

The refrigerant exits the second expansion device 480 and enters the second stream 494 of the heat exchanger 490 as a low-pressure liquid or two-phase mixture. The second stream 494 comes into thermal communication with the first stream 492, which carries high-pressure liquid refrigerant from the condenser 320 in the primary refrigerant loop 410. The thermal contact between the two streams 492, 494 cools the refrigerant in the first stream 492 and warms the refrigerant in the second stream 494, causing it to boil. The cooled refrigerant in the first stream 492 exits the heat exchanger 490 as a lower-temperature, high-pressure liquid, and the boiled refrigerant in the second stream 494 exits the heat exchanger 490 as a low-temperature, intermediate-pressure gas. The heat exchanger 490 may be a counterflow heat exchanger, a cross-flow heat exchanger, a parallel flow heat exchanger, a shell and tube heat exchanger, a mixing chamber, or any type of heat exchanger that allows the system 400 to function as described herein. In further embodiments, a flash tank may be used instead of or in addition to the heat exchanger 490.

The low-temperature, intermediate-pressure gas exiting the second stream 494 of the heat exchanger 490 is then injected into the refrigerant transfer conduit 112 of the compressor 100 to be mixed with the refrigerant flow of the primary refrigerant loop 410 before it reaches the second compressor stage 126. The primary and secondary refrigerant loops 410, 460 converge at the second compressor stage 126, and diverge once again after the refrigerant exits the condenser 320.

Figure 5:
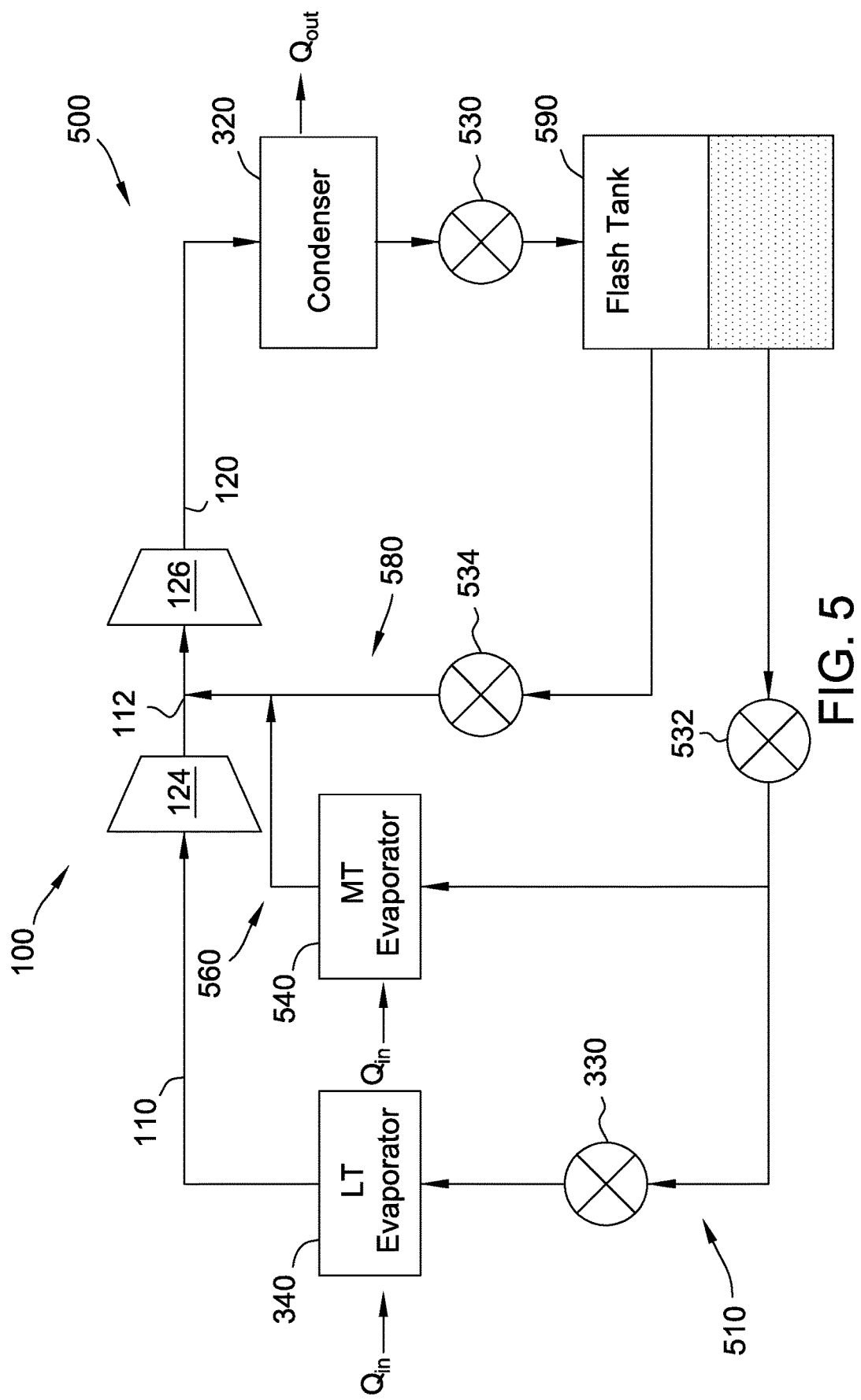
FIG. 5 is a schematic view of a third example HVAC system in which the dynamic compressor shown in FIGS. 1 and 2 can be installed.

FIG. 5 is a third example HVAC system 500 in which the compressor 100 of FIGS. 1 and 2 may be installed. System 500 includes a low temperature, primary refrigerant loop 510, a medium-temperature, secondary refrigerant loop 560, and a tertiary refrigerant loop 580 fluidly coupled thereto. Downstream of the condenser 320, the refrigerant flow is throttled through a first expansion device 530, reducing its pressure until some of the liquid refrigerant boils off, creating a two-phase mixture. A flash tank 590 separates the two-phase refrigerant mixture into liquid and gaseous fractions, which respectively diverge into the primary and tertiary loops 510, 580. In certain embodiments, a heat exchanger may be used instead of or in addition to the flash tank 590. The liquid refrigerant in the primary loop 510 is throttled through a second expansion device 532 and once again diverges, with a portion of the refrigerant continuing along the primary loop 510 and the remainder separating into the secondary loop 560. In the secondary loop 560, the refrigerant flows through a medium-temperature evaporator 540, where the refrigerant is boiled and converted to a gas, providing refrigeration to a medium-temperature space. In the primary loop 510, the liquid refrigerant 510 is throttled through a third expansion device 330 before entering a low-temperature evaporator 340, where the refrigerant is boiled and converted to a gas, providing refrigeration to a low-temperature space. The refrigerant then enters the first compressor stage 124, where it is compressed to the pressure of the medium-temperature evaporator 540. The gaseous refrigerant in the tertiary loop 580 is throttled through a fourth expansion device 534 to the pressure of the medium-temperature evaporator 540. The gaseous refrigerant in the secondary and tertiary loops 560, 580 are combined and injected into the refrigerant transfer conduit 112 between the first and second compressor stages 124, 126.

Figure 6:
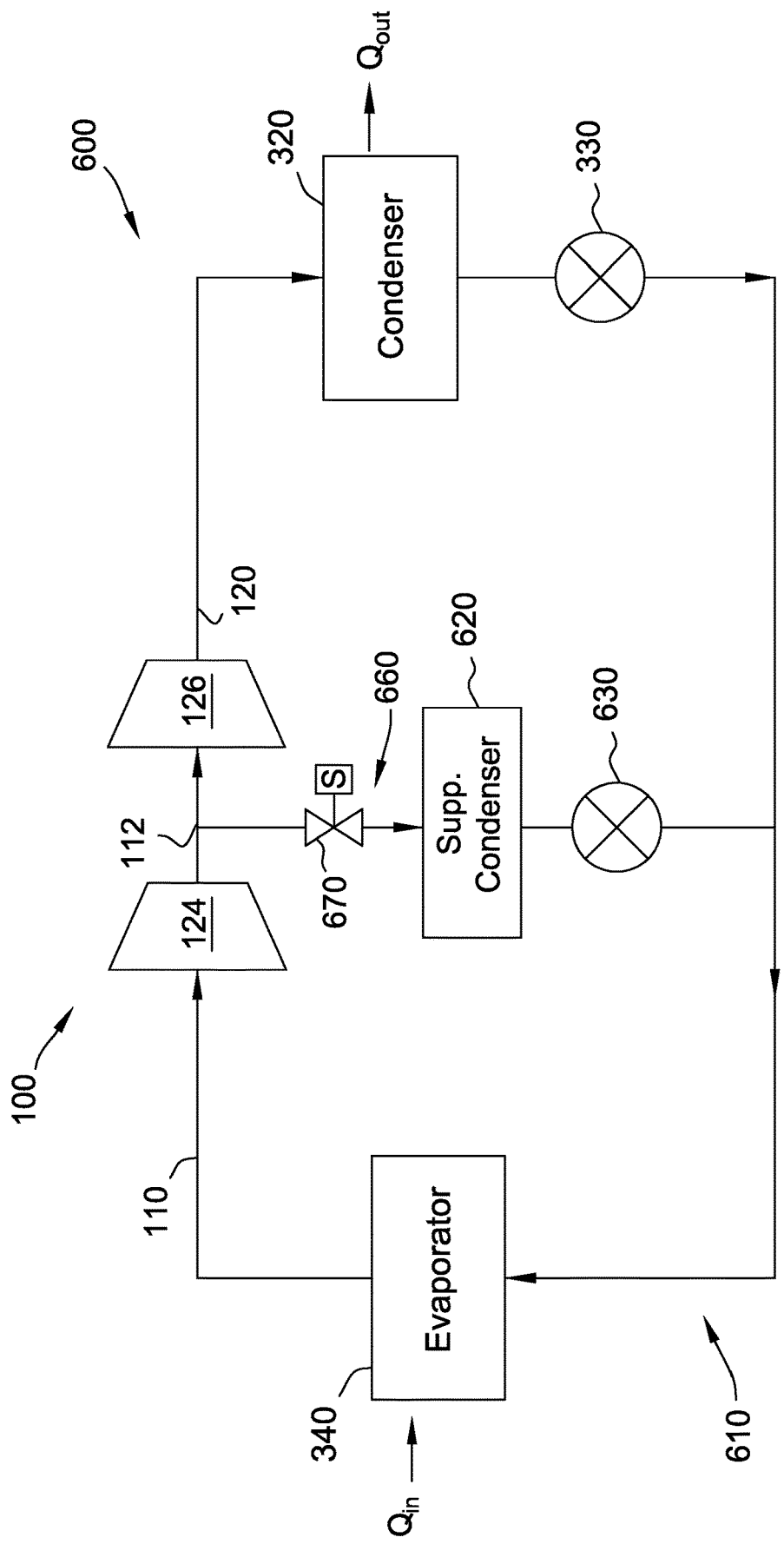
FIG. 6 is a schematic view of a fourth example HVAC system in which the dynamic compressor shown in FIGS. 1 and 2 can be installed.

FIG. 6 shows a fourth example HVAC system 600 in which the compressor 100 of FIGS. 1 and 2 may be installed. System 600 includes a primary refrigerant loop 610 that includes the compressor 100, the condenser 320, the first expansion device 330, and the evaporator 340. The system also includes a secondary refrigerant loop 660 that is fluidly connected to a portion of the primary refrigerant loop 610 and controlled by a valve 670. When the valve 670 is fully closed, all refrigerant flows through the primary loop 610, and the system 600 operates in substantially the same way as the system 300 illustrated in FIG. 3. When the valve 670 is open, a portion of the refrigerant flow is diverted from the refrigerant transfer conduit 112 between the first and second compressor stages 124, 126 and through the secondary loop 660. The diverted flow passes through a supplemental condenser 620 throttled by a second expansion device 630 and rejoins the primary loop 610 prior to entering the evaporator 340.

Figure 7:
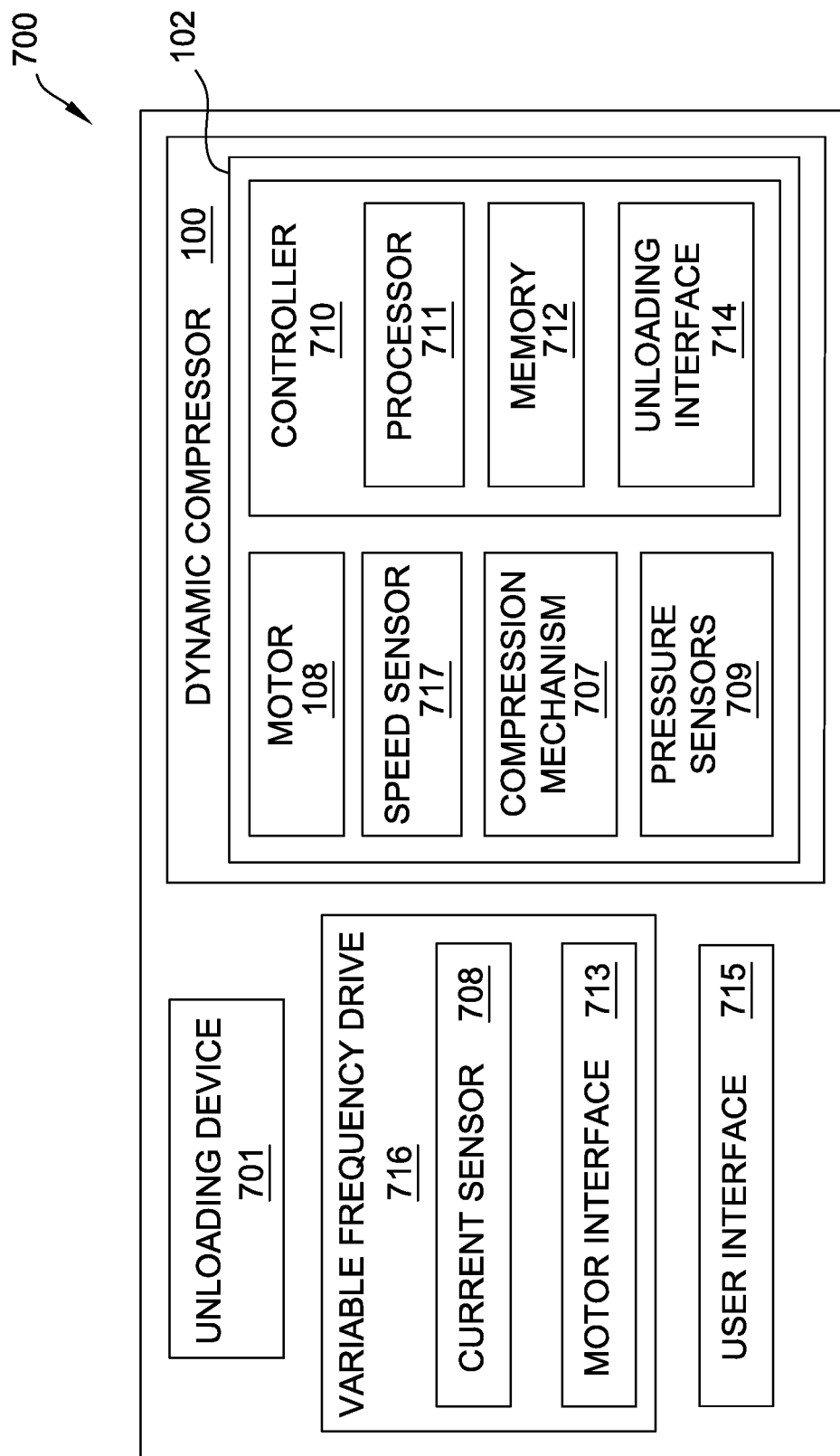
FIG. 7 is a block diagram of a control system for the dynamic compressor shown in FIGS. 1 and 2.

FIG. 7 shows an example embodiment of a system 700 including the dynamic compressor 100. The compressor 100 includes a compressor housing 102, a compression mechanism 707, a motor 108, a speed sensor 717, pressure sensors 709 and a controller 710. In the present embodiment, the dynamic compressor 100 is a two-stage centrifugal compressor, and the compression mechanism 707 is an impeller in each stage. In other embodiments, the dynamic compressor 100 may be an axial compressor, and the compression mechanism 707 may be an axial rotor. The speed sensor 717 measures the rotational speed of the compressor 100, and the pressure sensors 709 measure pressure at various points along the compressor flow path, including at the refrigerant inlet and the refrigerant exit. Additional sensors may be installed in the compressor 100 to provide data on its operation, including but not limited to temperature sensors, flow sensors, current sensors 708, voltage sensors, rotational rate sensors, and any other suitable sensors. The compressor 100 is not limited to a specific construction in the system 700 and may be constructed similarly to the compressor 100 described in FIGS. 1 and 2 or may be constructed in a different manner. The system 700 further includes an unloading device 701, a variable frequency drive (VFD) 716, and a user interface 715.

A controller 710 is operatively connected to the compressor 100 to control its operation, based in part on the measured parameters described above. The controller 710 includes a processor 711, a memory 712, and an unloading interface 714. The memory 712 stores a map 1000 (see, e.g., FIG. 14) of a plurality of predetermined operating points 50 of the compressor 100 which can be stored in any suitable data structure, such as a table, a matrix, or the like. The map 1000 may include a plurality of predetermined operating points of the first compressor stage 124 alone, the second compressor stage 126 alone, or the compressor 100 as a whole. The memory 712 additionally stores instructions that are executed by the processor 711 to operate the compressor 100 to compress the working fluid, determine when the first and second compressor stages 124, 126 are no longer flow-matched, and adjust the unloading device 701 at the inlet 110, 118 of each compressor stage 124, 126 to restore proper stage matching, if necessary. The map 1000 of predetermined operating points 50 and a method 1300 of determining whether the compressor stages 124, 126 are matched are discussed in greater detail further below.

The system 700 includes an interface for connection of the controller 710 to the VFD 716 and a motor interface 713 for connection of the VFD 716 to the motor 108. In certain embodiments, the VFD 716 operates under the control of the controller 710. In further embodiments, the VFD 716 is a part of the controller 710. The system 700 further includes an unloading interface 714 for connection of the controller 710 to the unloading device 701.

The controller 710 is operatively coupled to the unloading device 701 through the unloading interface 714, which removes and/or reduces the load on the compressor 100 during start-up and shut-down routines, during detected surge events, and when otherwise instructed by the controller 710 to do so. In the example embodiment, the unloading device 701 is a variable inlet guide vane (VIGV) at the inlet of each impeller stage (FIG. 2). In other embodiments, the unloading device 701 may be a variable diffuser. The controller 710 is configured to control at least one operating parameter of the unloading device 701, such as a position of each VIGV.

In other embodiments, the unloading device 701 is a bypass valve. Bypass valves, such as refrigerant bypass valves, provide an alternative path for the gas, thereby limiting the pressure rise of the compressor 100 and preventing any potential surge events, no matter how slowly the motor 108 is accelerating during start-up or decelerating during shut-down. In other embodiments, the unloading device 701 is an expansion valve. In still other embodiments, the unloading device 701 may be a variable orifice or diameter valve, such as a servo valve, and a fixed orifice or diameter valve, such as a solenoid valve or a pulse-width-modulated (PWM) valve configured to control opening and closing according to a duty cycle. Although many types of unloading devices are described here, the unloading device 701 may be any suitable device, or combination of devices, that reduce the load on the compressor 100. The unloading device 701 may additionally be used as a loading device to increase the load on the compressor 100.

The system 700 further includes a user interface 715 configured to output (e.g., display) and/or receive information (e.g., from a user) associated with the system 700. In some embodiments, the user interface 715 is configured to receive an activation and/or deactivation input from a user to activate and deactivate (i.e., turn on and off) or otherwise enable operation of the system 700. Moreover, in some embodiments, the user interface 715 is configured to output information associated with one or more operational characteristics of the system 700, including, for example and without limitation, warning indicators such as severity alerts, occurrence alerts, fault alerts, motor speed alerts, and any other suitable information.

The user interface 715 may include any suitable input devices and output devices that enable the user interface 715 to function as described herein. For example, the user interface 715 may include input devices including, but not limited to, a keyboard, mouse, touchscreen, joystick(s), throttle(s), buttons, switches, and/or other input devices. Moreover, the user interface 715 may include output devices including, for example and without limitation, a display (e.g., a liquid crystal display (LCD) or an organic light emitting diode (OLED) display), speakers, indicator lights, instruments, and/or other output devices. Furthermore, the user interface 715 may be part of a different component, such as a system controller (not shown). Other embodiments do not include a user interface 715.

The controller 710 is generally configured to control operation of the compressor 100. The controller 710 controls operation through programming and instructions from another device or controller or is integrated with the system 700 through a system controller. In some embodiments, for example, the controller 710 receives user input from the user interface 715, and controls one or more components of the system 700 in response to such user inputs. For example, the controller 710 may control the motor 108 based on user input received from the user interface 715. In some embodiments, the system 700 may be controlled by a remote control interface. For example, the system 700 may include a communication interface (not shown) configured for connection to a wireless control interface that enables remote control and activation of the system 700. The wireless control interface may be embodied on a portable computing device, such as a tablet or smartphone.

The controller 710 may generally include any suitable computer and/or other processing unit, including any suitable combination of computers, processing units and/or the like that may be communicatively coupled to one another and that may be operated independently or in connection within one another (e.g., controller 710 may form all or part of a controller network). Controller 710 may include one or more modules or devices, one or more of which is enclosed within system 700, or may be located remote from system 700. The controller 710 may be part of compressor 100 or separate and may be part of a system controller in an HVAC system. Controller 710 and/or components of controller 710 may be integrated or incorporated within other components of system 700. The controller 710 may include one or more processor(s) 711 and associated memory device(s) 712 configured to perform a variety of computer-implemented functions (e.g., performing the calculations, determinations, and functions disclosed herein).

As used herein, the term "processor" refers not only to integrated circuits, but also to a controller, a microcontroller, a microcomputer, a programmable logic controller (PLC), an application-specific integrated circuit, and other programmable circuits. Additionally, memory device(s) 712 of controller 710 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 712 may generally be configured to store suitable computer-readable instructions that, when implemented by the processor(s) 711, configure or cause the controller 710 to perform various functions described herein including, but not limited to, controlling the system 700, controlling operation of the motor 108, receiving inputs from user interface 715, providing output to an operator via user interface 715, controlling the unloading device 701 and/or various other suitable computer-implemented functions.

Figure 8:
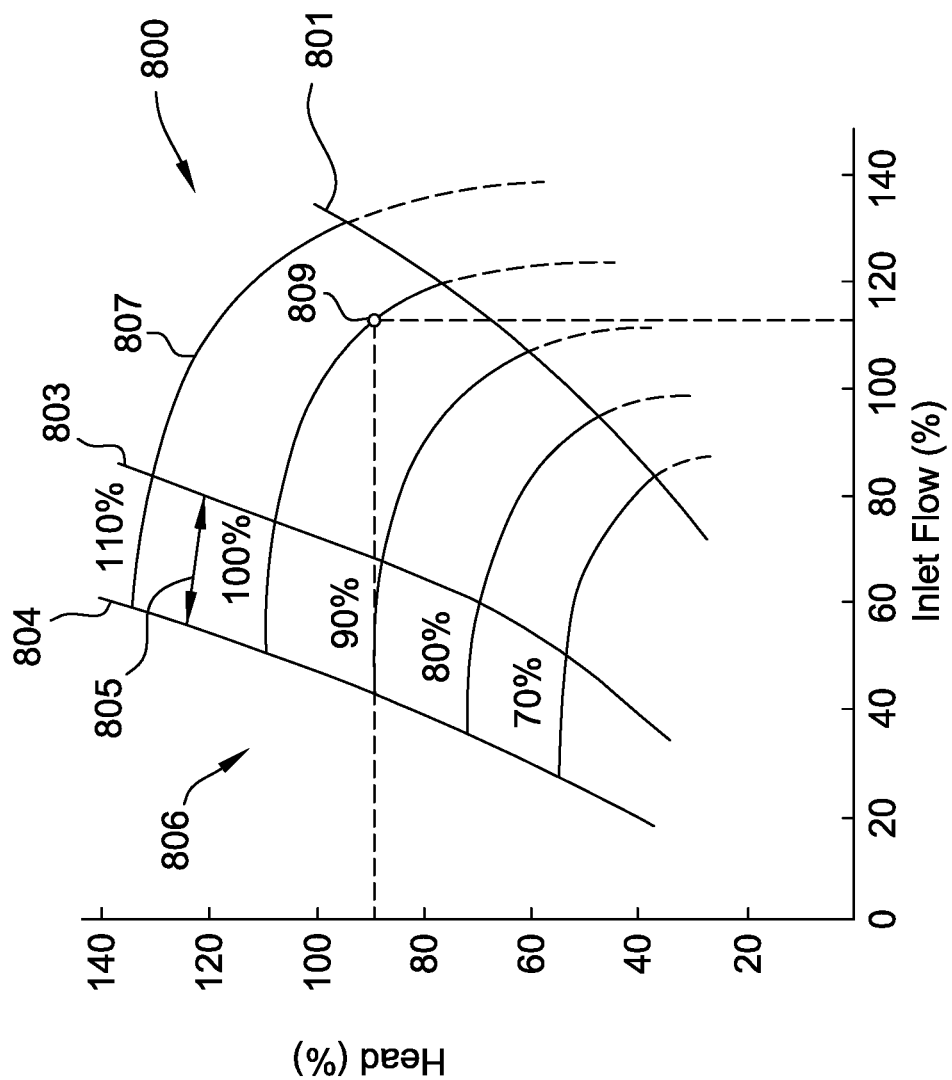
FIG. 8 is an operating map of the dynamic compressor shown in FIGS. 1 and 2.

Referring to FIG. 8, an operating envelope or operating map 800 of the example dynamic centrifugal compressor 100 is shown. This operating map 800 is one graphical representation of the map 1000 of a plurality of predetermined operating points 50 stored by the memory 712. The operating map 800 graphically displays a compressor's performance in terms of flows, heads, and speeds. The operating map 800 shows head vs. inlet mass flow rate as a percentage of their values at the design point of the compressor 100. The head is a total pressure ratio of exit pressure to inlet pressure. Inlet mass flow rate is a measure of the amount of a working fluid, such as a refrigerant, flowing through the compression mechanism 707. The operating map 800 shows a plurality of compressor speed lines 807. In this example, there are five speed lines 807 that range from 70% design speed to 110% design speed, with each line separated by a 10% difference. Although these particular speed lines are shown in this example, any number of speed lines at any different percentages of the compressor design speed may be shown for any type of compressor.

A surge limit line 804 indicates the minimum flow before surge occurs in the surge region 806 (i.e., to the left of surge limit line 804). A surge control line 803 roughly indicates the minimum flow under which the compressor 100 can safely operate without risk of slipping into surge. The surge control line 803 is defined by a surge margin 805 from the surge limit line 804. By operating to the right of the surge control line 803, the compressor 100 should avoid surging. Similarly, the choke line 801 indicates that operation to its right will result in the compressor 100 operating with choked flow.

A first operating point 809 of the compressor 100 is shown on the operating map 800 as the intersection of a speed line, inlet mass flow rate value, and total pressure ratio value. For example, the first operating point 809 shown in operating map 800 is at 112% inlet mass flow rate, 90% head, and 100% speed, though any number of operating points may be shown for any type of compressor. The operating point defines the current operating parameters of the compressor 100, and the operating map 800 indicates how close the current operating point is to operating in an unstable condition (i.e., surge) or an inefficient condition (i.e., choke).

The first operating point 809 shown in FIG. 8 may represent operation of the compressor 100 when the first and second compressor stages 124, 126 receive the same mass flow. For example, the first operating point 809 may represent operation of the compressor 100 as installed in the first example HVAC system 300 shown in FIG. 3. Alternatively, the first operating point 809 may represent operation of the compressor 100 as installed in the second example HVAC system 400 shown in FIG. 4 when the economization valve 470 of the HVAC system 400 is closed; that is, when refrigerant only circulates through the primary loop 410, and there is no economizer flow added between compressor stages 124, 126. The first operating point 809 may also represent operation of the compressor 100 as installed in the fourth example HVAC system 600 shown in FIG. 6 when the valve 670 is closed; that is, when refrigerant only circulates through the primary loop 610, and no flow is removed from between compressor stages 124, 126.

Figure 9:
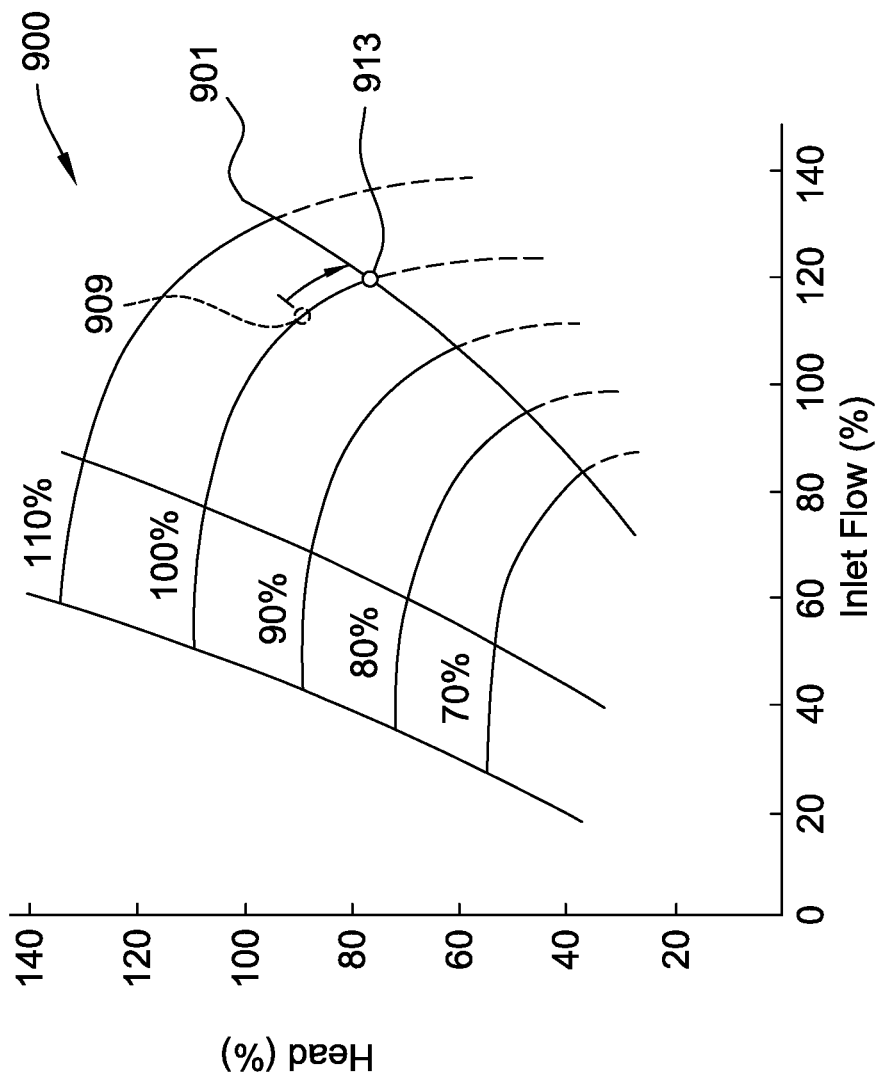
FIG. 9 is an operating map of a second compressor stage of the dynamic compressor shown in FIGS. 1 and 2, illustrating a current operating point both before and after flow is injected upstream of the second compressor stage.

FIG. 9 shows an operating map 900 of the second compressor stage 126 of the dynamic compressor 100. A second operating point 909 may represent operation of the second compressor stage 126 when the first and second compressor stages 124, 126 receive the same mass flow, as in the configurations described above. A third operating point 913 may represent the second compressor stage's 126 operating conditions when flow is added between compressor stages 124, 126. For example, the third operating point 913 may represent operation of the compressor 100 as installed in system 400 when the economization valve 470 is opened. The third operating point 913 may also represent operation of the compressor 100 as installed in system 500 illustrated in FIG. 5.

The second compressor stage 126 is unable to achieve the same pressure rise for a higher mass flow at the same compressor speed. As a result, the current operating point of the second compressor stage 126 shifts to the right along the 100% speed line from second operating point 909 to third operating point 913. Accordingly, the third operating point 913 indicates operation of the second stage 126 at the same speed as second operating point 909, but with a greater inlet mass flow and a lower head. If the third operating point 913 of the second compressor stage 126 shifts past a second stage choke line 901, the second compressor stage 126 will operate with choked flow. This causes the entire compressor 100 to operate with choked flow, degrading its performance and efficiency.

Figure 10:
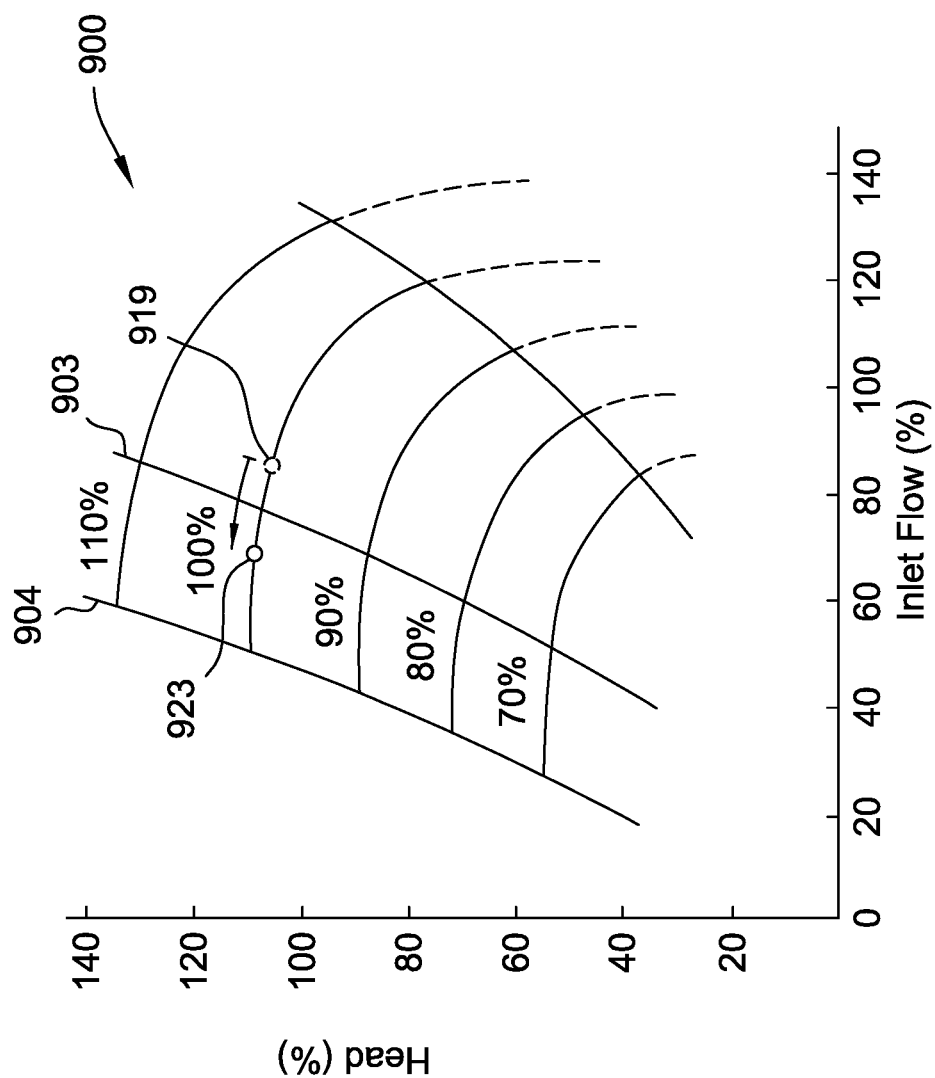
FIG. 10 is an operating map of the second compressor stage of the dynamic compressor shown in FIGS. 1 and 2, illustrating a current operating point both before and after flow is removed upstream of the second compressor stage.

With reference to FIG. 10, a fourth operating point 919 is another example representation of the operation of the second compressor stage 126 when the first and second compressor stages 124, 126 receive the same mass flow, as in the configurations described above. A fifth operating point 923 represents the second compressor stage's 126 operating conditions when flow is removed between compressor stages 124, 126. For example, the fifth operating point 923 may represent operation of the compressor 100 as installed in the fourth example HVAC system 600 shown in FIG. 6 when the valve 670 is open and flow is removed from between compressor stages 124, 126. Reducing the mass flow through the second compressor stage 126 shifts its operating point to the left along the 100% speed line, from the fourth operating point 919 to the fifth operating point 923. Accordingly, the fifth operating point 923 indicates operation of the second stage 126 at the same speed as fourth operating point 919, but with a reduced inlet flow. If the fifth operating point 923 of the second compressor stage 126 shifts past a surge control line 903 or a surge limit line 904 of the second stage, the second compressor stage 126 will be at risk of slipping into surge. A surge event in the second compressor stage 126 disrupts the machine as a whole, leading to possible structural damage.

The decline in performance and operating range illustrated in FIGS. 9 and 10 can be mitigated by adjusting the position of the second VIGV 136, thereby shifting the operating map of the second compressor stage 126 so the second compressor stage 126 will neither choke nor surge before the compressor 100 as a whole. FIGS. 9 and 10 show the operating map 900 of the second compressor stage 126 when the first and second VIGVs 134, 136 have the same position. In other words, the first position of the first VIGV 134 and the second position of the second VIGV 136 are the same position.

Figure 11:
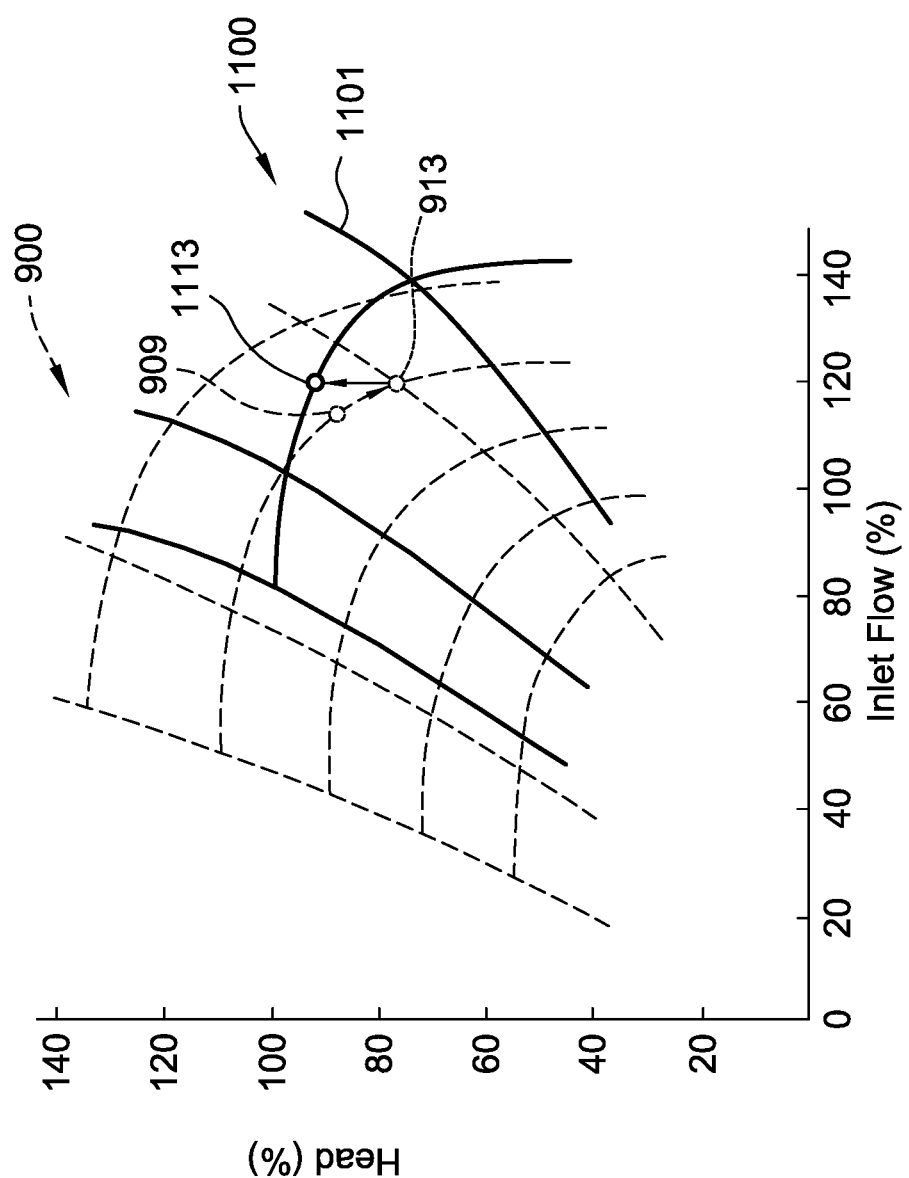
FIG. 11 is an operating map of the second compressor stage of the dynamic compressor shown in FIGS. 1 and 2 when flow is injected upstream of the second compressor stage, and when a second VIGV is moved from a second position to a position different than the second position.

FIG. 11 shows an operating map 1100 of the second compressor stage 126 when the second VIGV 136 has been moved to a third position different than the second position. The operating map 1100 is overlaid on the operating map 900 shown in FIG. 9, including the second and third operating points 909, 913. Adjusting the second VIGV 136 to the third position changes the pre-whirl added to the refrigerant gas entering the second compressor stage 126, shifting its operating envelope to the right to extend its choke range. Since the speed of the second compressor stage 126 remains the same, the current operating point is shifted upwards to the new 100% speed line of the second compressor stage 126, from the third operating point 913 to a sixth operating point 1113. Since the sixth operating point 1113 is to the left of the new choke line 1101, the second compressor stage 126 will no longer operate with choked flow. This allows the HVAC system 400, 500 to reap the benefits of an economization loop or booster system without compromising the performance and operating range of the compressor 100.

Figure 12:
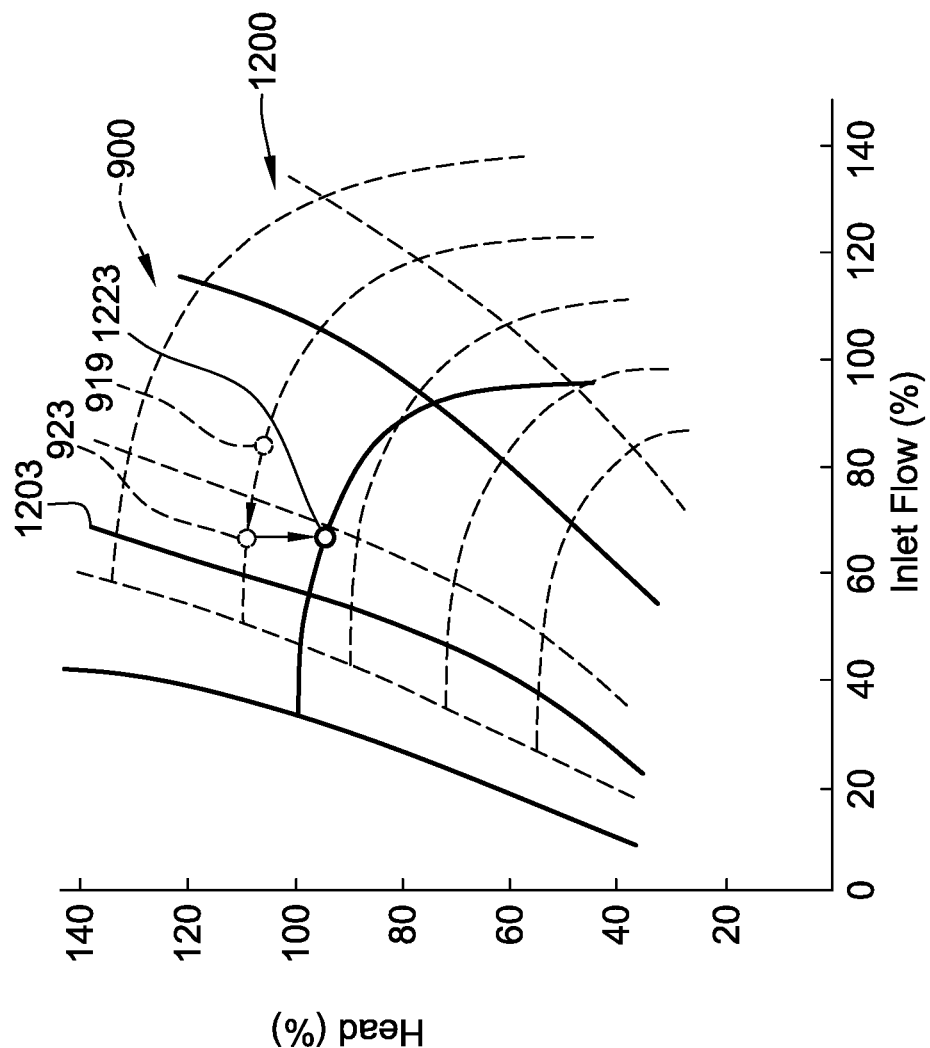
FIG. 12 is an operating map of the second compressor stage of the dynamic compressor shown in FIGS. 1 and 2 when flow is removed from upstream of the second compressor stage, and when a second VIGV is moved from the second position to a position different than the second position.

With reference to FIG. 12, the third position of the second VIGV 136 may also be chosen such that the operating envelope of the second compressor stage 126 shifts to the left to extend the surge range of the compressor 100. FIG. 12 illustrates an operating map 1200 of the second compressor stage 126 when the second VIGV 136 has been adjusted to a third position that extends the surge range of the compressor 100. The operating map 1200 is overlaid on the operating map 900 shown in FIG. 9, including the fourth and fifth operating points 919, 923. The current operating point is shifted downwards to the new 100% speed line of the second compressor stage 126, from the fifth operating point 923 to a seventh operating point 1223. Since the seventh operating point 1223 is to the right of the new surge control line 1203, the second compressor stage 126 will no longer be at risk of surging before the rest of the compressor 100.

Figure 13:
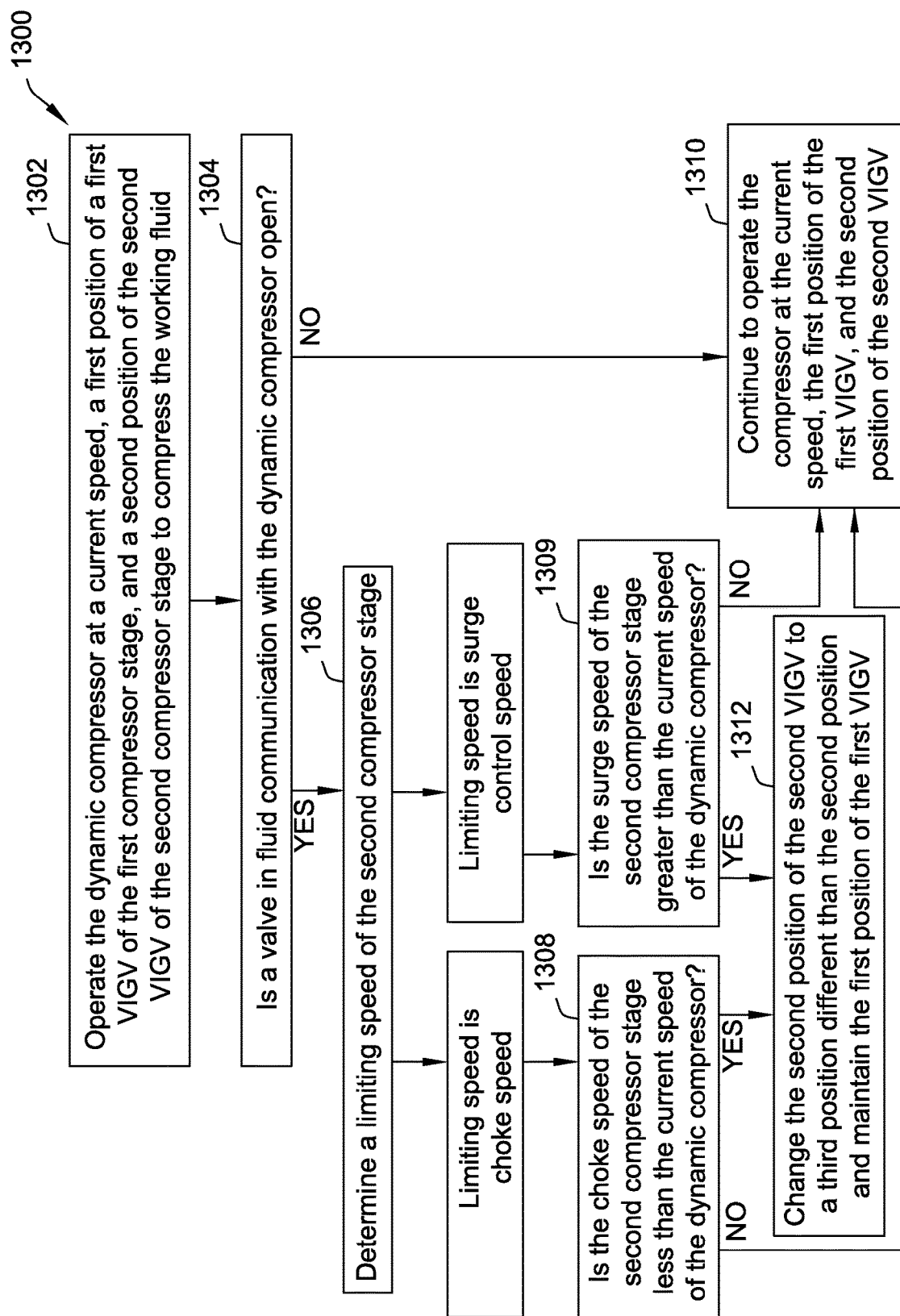
FIG. 13 is a method of extending the operating range of the dynamic compressor shown in FIGS. 1 and 2.

The memory 712 stores instructions that program the processor 711 to extend the operating range of the compressor 100 as described above. An example method 1300 is shown in FIG. 13. The processor 711 operates 1302 the compressor 100 at a current speed, a first position of the first VIGV 134 and a second position of the second VIGV 136 to compress the working fluid. In some embodiments, the first position of the first VIGV 134 and the second position of the second VIGV 136 are the same position. While operating 1302 the dynamic compressor 100, the processor 711 determines if a condition is satisfied. If the condition is not satisfied, the instructions stored in the memory 712 program the processor 711 to continue 1310 to operate the compressor 100 at the current speed, the first position of the first VIGV 134, and the second position of the second VIGV 136. If the condition is satisfied, the instructions stored in the memory 712 program the processor 711 to change 1312 the second position of the second VIGV 136 to a third position different than the second position and maintain the first position of the first VIGV 134.

In the example method shown in FIG. 13, determining if a condition is satisfied includes determining 1304 if a valve in fluid communication with the compressor 100 is open. In certain embodiments, the valve may be the economization valve 470 of the system 400 shown in FIG. 4. In other embodiments, the valve may be the valve 670 of the system 600 shown in FIG. 6. The valve is considered open if it is fully or partially open such that a portion of the primary refrigerant loop is fluidly connected to the secondary refrigerant loop at the valve. If the valve is not open, the condition is not satisfied, and the compressor 100 continues 1310 to operate at its current conditions.

If the valve is open, the processor 711 is additionally programmed to determine 1306 a limiting speed of the second compressor stage 126. In embodiments where the valve is the economization valve 470 of the system 400 shown in FIG. 4, the limiting speed of the second compressor stage 126 may be a choke speed of the second compressor stage 126. In such embodiments, if the processor 711 determines 1308 that the choke speed of the second compressor stage 126 is greater than or equal to the current speed of the dynamic compressor 100, the condition is not satisfied, and the compressor continues 1310 to operate at its current conditions. If the processor 711 determines 1308 that the choke speed of the second compressor stage 126 is less than the current speed of the dynamic compressor 100, the condition is satisfied, and the second position of the second VIGV 136 will change 1312 to a third position different than the second position and maintain the first position of the first VIGV 134. Thus, the condition is satisfied when the economization valve 470 is open and the choke speed of the second compressor stage 126 is less than the current speed of the dynamic compressor 100.

In embodiments where the valve is the valve 670 of the system 600 shown in FIG. 6, the limiting speed of the second compressor stage 126 may be a surge control speed of the second compressor stage 126. In such embodiments, if the processor 711 determines 1309 that the surge control speed of the second compressor stage 126 is less than or equal to the current speed of the dynamic compressor 100, the condition is not satisfied, and the compressor continues 1310 to operate at its current conditions. If the processor 711 determines 1309 that the surge control speed of the second compressor stage 126 is greater than the current speed of the dynamic compressor 100, the condition is satisfied, and the second position of the second VIGV 136 will change 1312 to a third position different than the second position and maintain the first position of the first VIGV 134. Thus, the condition is satisfied when the valve 670 is open and the surge control speed of the second compressor stage 126 is greater than the current speed of the dynamic compressor 100.

Figure 14:
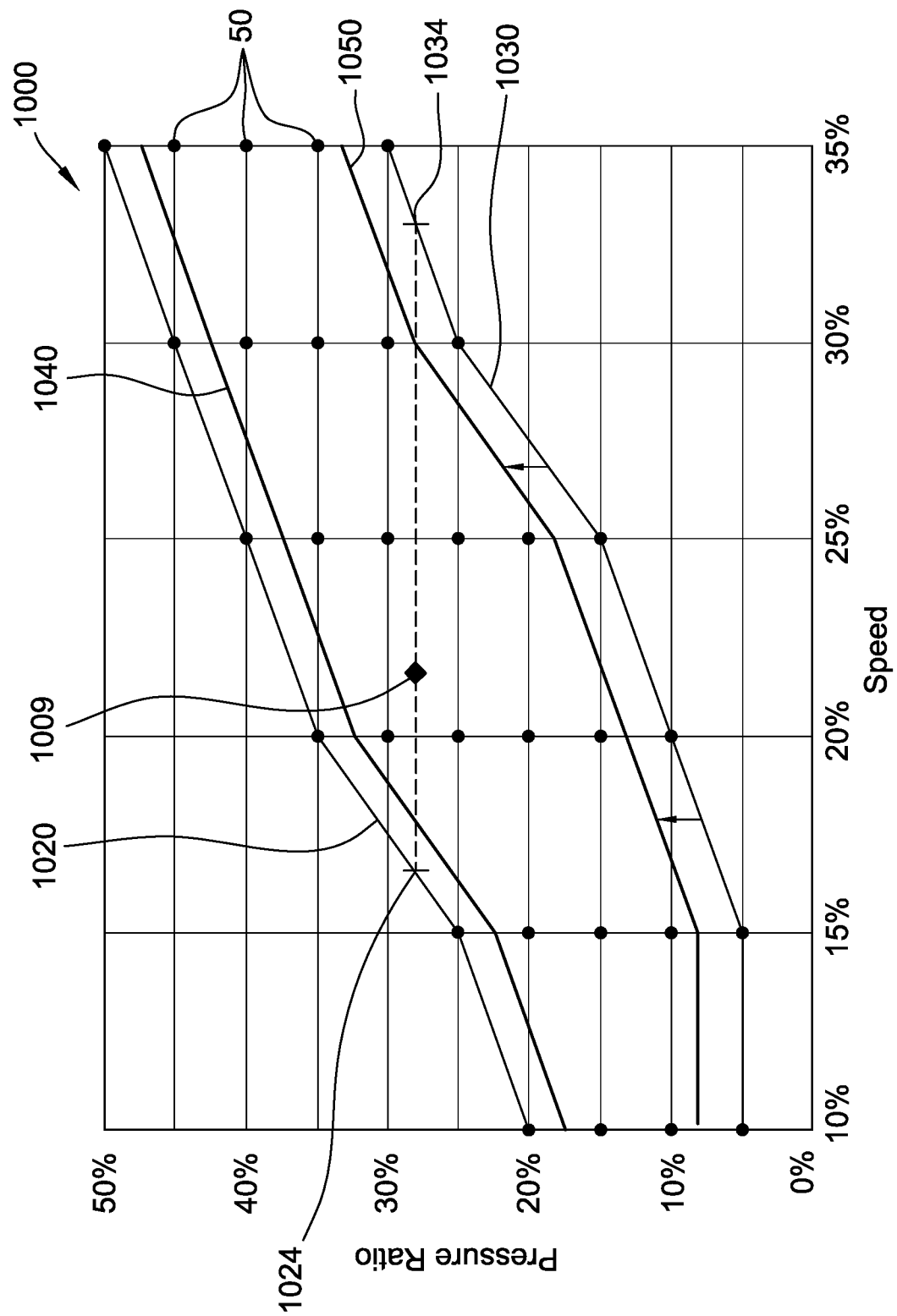
FIG. 14 is a map of predetermined operating points of the dynamic compressor shown in FIGS. 1 and 2.

The method 1300 may be used in embodiments where the memory 712 further stores a map 1000 of predetermined operating points 50 of the compressor 100. FIG. 14 is a representative illustration of a map 1000 of predetermined operating points 50 stored by the memory 712. Each predetermined operating point 50 is shown as the intersection of a compressor speed value and a stage pressure ratio value. An inlet mass flow rate is defined for each predetermined operating point 50. The map 1000 includes predetermined operating points 50 in a range up to and including points along the machine surge line 1020 and the machine choke line 1030. The memory 712 stores a surge point mass flow for each predetermined surge point and a choke point mass flow for every predetermined choke point. The map 1000 does not include any points above the surge line 1020 or below the choke line 1030, because points above the surge line 1020 or below the choke line 1030 are to be avoided and are thus not "operating points." In other embodiments, the inlet mass flow rate of points above the surge line 1020 or below the choke line 1030 may be included.

In the map 1000, the predetermined operating points 50 range between 10% and 35% speed, and between 5% and 50% pressure ratio, with each point separated by 5% on both axes. Although these particular operating points 50 are shown in this example, any number of operating points at any values and with any resolution may be shown for any type of compressor. The speed, pressure ratio, inlet mass flow rate, and VIGV position values of each predetermined operating point 50 may be generated by simulating operation of the dynamic compressor 100 on a computer, testing the dynamic compressor 100 in a controlled environment, a combination of simulation and testing, or by any other suitable method for predetermining the speed, pressure ratio, inlet mass flow rate, and VIGV position values of each predetermined operating point 50.

The map 1000 shown in FIG. 14 may include predetermined operating points 50 of the second compressor stage 126 alone. In addition to the machine choke line 1032 and surge control line 1020, the map 1000 also shows the choke line 1050 of the second compressor stage 126 when flow is added between compressor stages 124, 126, as well as the surge line 1040 of the second compressor stage 126 when flow is removed between compressor stages 124, 126. In such embodiments, determining 1306 the limiting speed of the second compressor stage 126 includes retrieving a value of a predetermined operating point 50 of the second compressor stage 126 from the map 1000 of predetermined operating points 50.

The predetermined operating points 50 retrieved from the map 1000 may indicate the choke speed or the surge control speed of the second compressor stage 126 at the current operating point 1009, or they may be used to graphically determine the choke speed or surge control speed at the current operating point. For example, the choke speed of second compressor stage 126 at the current operating point 1009 is indicated at 1034, and the surge control speed is indicated at 1024. The predetermined operating points 50 may have the same speed, pressure ratio, and inlet mass flow as the current operating point 1009 of the second compressor stage 126. In further embodiments, the predetermined operating points 50 closest to the current operating point 1009 may be retrieved. In further embodiments, a new point corresponding to the current operating point 1009 may be interpolated from the predetermined operating points 50. A method of mass flow interpolation using a plurality of predetermined operating points is disclosed in U.S. patent application Ser. No. 17/243,787 which is incorporated by reference herein in its entirety.

Figure 15:
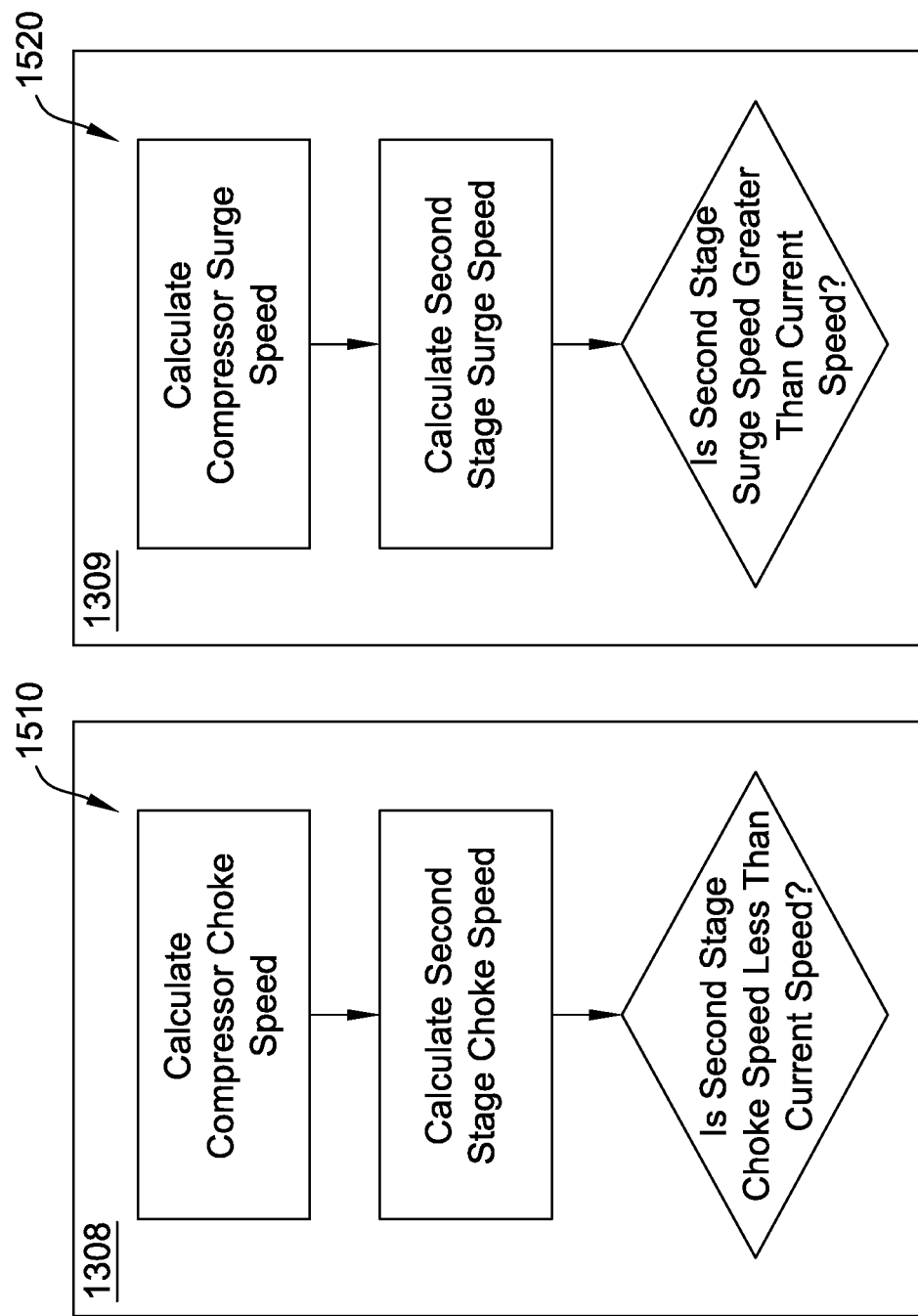
FIG. 15 is a flow chart of example control algorithms for determining a limiting speed of the second compressor stage of the dynamic compressor shown in FIGS. 1 and 2 when flow is added or removed from upstream of the second compressor stage.

The map 1000 may alternatively include predetermined operating points of the compressor 100 as a whole. In such embodiments, the limiting speed of the second compressor stage 126 can be calculated instead of directly retrieved. FIG. 15 shows a flow chart of example control algorithms 1510, 1520 for determining 1308, 1309 the limiting speed of the second compressor stage 126 when flow is added or removed between compressor stages 124, 126. The compressor choke speed, which is the speed at which the compressor 100 will choke for a given pressure rise, can be determined graphically from the map 1000. For example, and with reference to FIG. 14, the compressor choke speed 1034 of the current operating point 1009 is around 33% of the compressor design speed. If the economization valve 470 of system 400 is open, the choke speed of the second compressor stage 126 can be calculated and compared to the current speed of the compressor 100. In the control algorithm 1510 shown in FIG. 15, the choke speed of the second compressor stage 126 can be calculated from the compressor choke speed. For example, the second stage choke speed can be calculated as the difference between the compressor choke speed retrieved from the map 1000 of predetermined operating points 50 and the product of the compressor pressure ratio PR and a predetermined constant k:

$$N_{choke,2S} = N_{choke,compressor} - PR * k$$

In some embodiments, the predetermined constant k is 500.

The compressor surge control speed, which is the speed past which the compressor 100 may surge for a given pressure rise, can be determined graphically from the map 1000. For example, and with reference to FIG. 14, the compressor surge control speed 1024 of the current operating point 1009 is around 17% of the compressor design speed. If the valve 670 of system 600 is open, the surge control speed of the second compressor stage 126 can be calculated and compared to the current speed of the compressor 100. In the control algorithm 1520 shown in FIG. 15, the surge control speed of the second compressor stage 126 can be calculated from the compressor surge control speed. For example, the second stage surge control speed can be calculated as the sum of the compressor surge control speed retrieved from the map 1000 of predetermined operating points 50 and the product of the compressor pressure ratio PR and a predetermined constant k:

$$N_{surge control,2S} = N_{surge control,compressor} + PR * k$$

In some embodiments, the predetermined constant k is 500.

Technical benefits of the methods and systems described herein are as follows: (a) HVAC system efficiency can be improved with cycle modifications that increase the system's capacity and efficiency without compromising the performance and operating range of the compressor, and (b) the operating range of the compressor can be extended in either direction by controlling the VIGV at each compressor stage separately.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A system comprising:
    a dynamic compressor operable to compress a working fluid, the dynamic compressor comprising:
        a first compressor stage having a first variable inlet guide vane (VIGV) controllable to selectively introduce pre-whirl into working fluid entering the first compressor stage; and
        a second compressor stage having a second VIGV controllable to selectively introduce pre-whirl into working fluid entering the second compressor stage; and
        a motor configured to drive the first compressor stage and the second compressor stage at a same speed;
    a valve in fluid communication with the dynamic compressor between the first compressor stage and the second compressor stage; and
    a controller connected to the dynamic compressor, the controller comprising a processor and a memory, the memory storing instructions that program the processor to:
        operate the dynamic compressor at a current speed, a first position of the first VIGV, and a second position of the second VIGV to compress the working fluid;
        determine, while operating the dynamic compressor, if a condition is satisfied;
        continue to operate the compressor at the current speed, the first position of the first VIGV, and the second position of the second VIGV when the condition is not satisfied; and
        change the second position of the second VIGV to a third position different than the second position and maintain the first position of the first VIGV when the condition is satisfied.

2. The system of claim 1, wherein determining if the condition is satisfied comprises determining if the valve is open.

3. The system of claim 2, wherein the memory further stores instructions that program the processor to determine a limiting speed of the second compressor stage when the valve is open.

4. The system of claim 3, wherein the limiting speed is a choke speed of the second compressor stage, and wherein determining if the condition is satisfied further comprises determining that the condition is satisfied when the valve is open and the choke speed of the second compressor stage is less than the current speed of the dynamic compressor.

5. The system of claim 3, wherein the limiting speed is a surge control speed of the second compressor stage, and wherein determining if the condition is satisfied further comprises determining that the condition is satisfied when the valve is open and the surge control speed of the second compressor stage is greater than the current speed of the dynamic compressor.

6. The system of claim 3, wherein the memory further stores a map of predetermined operating points of the dynamic compressor.

7. The system of claim 6, wherein:
the map of predetermined operating points comprises operating points of the second compressor stage; and
determining the limiting speed of the second compressor stage comprises retrieving a value of an operating point of the second compressor stage from the map of predetermined operating points.

8. The system of claim 6, wherein determining the limiting speed of the second compressor stage comprises calculating the limiting speed of the second compressor stage based on a compressor pressure ratio, a value of the limiting speed retrieved from the map of predetermined operating points and based on the compressor pressure ratio, and a predetermined constant.

9. The system of claim 2, wherein the first position of the first VIGV and the second position of the second VIGV are a same position.

10. The system of claim 2, wherein the valve fluidly connects a portion of a primary refrigerant loop to a secondary refrigerant loop, wherein the secondary refrigerant loop connects an exit of the first compressor stage to an inlet of the second compressor stage.

11. The system of claim 10, wherein:
the primary refrigerant loop comprises:
a condenser fluidly coupled to the second compressor stage;
a first expansion device fluidly coupled to the condenser; and
an evaporator fluidly coupled to the first expansion device and the first compressor stage; and
the secondary refrigerant loop comprises:
a second expansion device fluidly coupled to the condenser; and
a heat exchanger fluidly coupled to the second expansion device, the condenser, and the second compressor stage.

12. A controller for a dynamic compressor having a motor, a first compressor stage driven by the motor, and a second compressor stage driven by the motor, the controller comprising:
a processor; and
a memory, the memory storing instructions that program the processor to:
operate the dynamic compressor at a current speed, a first position of a first variable inlet guide vane (VIGV) of the first compressor stage, and a second position of a second VIGV of the second compressor stage to compress a working fluid, the first VIGV being controllable to selectively introduce pre-whirl into working fluid entering the first compressor stage and the second VIGV being controllable to selectively introduce pre-whirl into working fluid entering the second compressor stage;
determine, while operating the dynamic compressor, if a condition is satisfied;
continue to operate the compressor at the current speed, the first position of the first VIGV, and the second position of the second VIGV when the condition is not satisfied; and
change the second position of the second VIGV to a third position different than the second position and maintain the first position of the first VIGV when the condition is satisfied.

13. The controller of claim 12, wherein determining if the condition is satisfied comprises:
determining if a valve in fluid communication with the dynamic compressor is open; and
determining a limiting speed of the second compressor stage when the valve is open.

14. The controller of claim 13, wherein the limiting speed is a choke speed of the second compressor stage, and wherein determining if the condition is satisfied further comprises determining that the condition is satisfied when the valve is open and the choke speed of the second compressor stage is less than the current speed of the dynamic compressor.

15. The controller of claim 13, wherein the limiting speed is a surge control speed of the second compressor stage, and wherein determining if the condition is satisfied further comprises determining that the condition is satisfied when the valve is open and the surge control speed of the second compressor stage is greater than the current speed of the dynamic compressor.

16. The controller of claim 13, wherein the memory further stores a map of predetermined operating points of the dynamic compressor.

17. The controller of claim 16, wherein:
the map of predetermined operating points comprises operating points of the second compressor stage; and
determining the limiting speed of the second compressor stage comprises retrieving a value of an operating point of the second compressor stage from the map of predetermined operating points.

18. The controller of claim 16, wherein determining the limiting speed of the second compressor stage comprises calculating the limiting speed of the second compressor stage based on a compressor pressure ratio, a value of the limiting speed retrieved from the map of predetermined operating points and based on the compressor pressure ratio, and a predetermined constant.

19. A method of extending an operating range of a dynamic compressor that is compressing a working fluid, the dynamic compressor having a motor, a first compressor stage driven by the motor, and a second compressor stage driven by the motor, a valve being in fluid communication with the dynamic compressor between the first compressor stage and the second compressor stage, the method comprising:
operating the dynamic compressor at a current speed, a first position of a first variable inlet guide vane (VIGV)

of the first compressor stage, and a second position of a second VIGV of the second compressor stage to compress the working fluid, the first VIGV being controllable to selectively introduce pre-whirl into working fluid entering the first compressor stage and the second VIGV being controllable to selectively introduce pre-whirl into working fluid entering the second compressor stage;

determining, while operating the dynamic compressor, if a condition is satisfied;

continuing to operate the compressor at the current speed, the first position of the first VIGV, and the second position of the second VIGV when the condition is not satisfied; and changing the second position of the second VIGV to a third position different than the second position and maintaining the first position of the first VIGV when the condition is satisfied.

20. The method of claim 19, wherein determining if the condition is satisfied comprises:

determining if a valve in fluid communication with the dynamic compressor is open; and determining a limiting speed of the second compressor stage when the valve is open.

* * * * *